US012791126B2

(12) United States Patent
Norwood et al.

(10) Patent No.: US 12,791,126 B2
(45) Date of Patent: Nov. 10, 2026

(54) ANTI-ROTATION KEY FOR CONNECTOR ASSEMBLY

(71) Applicant: Innovex International, Inc., Houston, TX (US)

(72) Inventors: Gregory K. Norwood, Boerne, TX (US); Oscar Maldonado, Houston, TX (US)

(73) Assignee: Innovex International, Inc., Humble, TX (US)

( * ) Notice: Subject to any disclaimer, the term of this patent is extended or adjusted under 35 U.S.C. 154(b) by 0 days.

(21) Appl. No.: 19/196,857

(22) Filed: May 2, 2025

(65) Prior Publication Data

US 2026/0348493 A1 Nov. 5, 2026

(51) Int. Cl.

| | |
|---|---|
| ***F16L 15/08*** | (2006.01) |
| ***E21B 17/043*** | (2006.01) |
| ***E21B 17/046*** | (2006.01) |
| ***E21B 17/16*** | (2006.01) |
| ***F16L 19/00*** | (2006.01) |

(52) U.S. Cl.

CPC ............ *F16L 15/08* (2013.01); *E21B 17/043* (2013.01); *E21B 17/0465* (2020.05); *E21B 17/16* (2013.01); *F16L 19/005* (2013.01)

(58) Field of Classification Search

CPC ................................ F16L 15/08; E21B 17/16

See application file for complete search history.

(56) References Cited

U.S. PATENT DOCUMENTS

| | | | |
|---|---|---|---|
| 7,146,704 | B2 | 12/2006 | Otten et al. |
| 8,469,102 | B2 | 6/2013 | Yates |
| 8,474,876 | B2 | 7/2013 | Watterson, II et al. |
| 8,690,200 | B1 | 4/2014 | Patterson, Jr. |
| 8,950,785 | B2 | 2/2015 | Raynal et al. |
| 9,410,647 | B2 | 8/2016 | Steen et al. |
| 9,708,865 | B2 | 7/2017 | Steen et al. |
| 9,714,731 | B2 | 7/2017 | O'Dell et al. |
| 9,890,598 | B2 | 2/2018 | Steen et al. |
| 10,077,613 | B2 | 9/2018 | Deberry et al. |
| 10,077,858 | B2 | 9/2018 | Pallini, Jr. et al. |
| 10,132,124 | B2 | 11/2018 | Gallagher et al. |
| 10,184,303 | B2 | 1/2019 | Wade et al. |
| 10,344,896 | B2 | 7/2019 | Ellisor et al. |
| 10,385,994 | B2 | 8/2019 | Deberry |
| 10,435,957 | B2 | 10/2019 | Deberry et al. |
| 10,465,451 | B2 | 11/2019 | Pallini et al. |
| 10,597,950 | B2 | 3/2020 | Mcgowan et al. |
| 10,605,012 | B2 | 3/2020 | Loose-Mitchell et al. |

(Continued)

*Primary Examiner* — James M Hewitt, II

(74) *Attorney, Agent, or Firm* — Baker Botts L.L.P.

(57) ABSTRACT

An anti-rotation key for preventing rotational displacement between two threaded portions of a connector assembly includes a gripper insert and a body. The body features an inclined surface that is designed to engage with a corresponding activation shoulder on one of the threaded portions, creating a secure mechanical connection. Additionally, the body incorporates a recess positioned opposite the inclined surface. This recess is specifically configured to accommodate the gripper insert, ensuring a firm grip on the surface of the remaining threaded portion. To secure the anti-rotation key to the connector assembly, an elliptical opening is provided in the body. This opening is designed to accommodate a fastener, which passes through the key and is fastened to one of the threaded portions.

18 Claims, 11 Drawing Sheets

(56) References Cited

U.S. PATENT DOCUMENTS

| | | | |
|---|---|---|---|
| 10,612,319 | B2 | 4/2020 | Nelson et al. |
| 11,454,338 | B2 | 9/2022 | Deberry |
| 11,459,833 | B2 | 10/2022 | Martinchich et al. |
| 11,512,799 | B2 | 11/2022 | Pallini et al. |
| 11,661,801 | B2 | 5/2023 | Benedict et al. |
| 12,116,848 | B2 | 10/2024 | Mantovano et al. |
| 12,163,383 | B2 | 12/2024 | Zabaloy et al. |
| 2024/0027001 | A1 | 1/2024 | Hebert et al. |

ANTI-ROTATION KEY FOR CONNECTOR ASSEMBLY

TECHNICAL FIELD

The present disclosure relates generally to connector assemblies for coupling strings of tubular and other components and, more particularly, to anti-rotation devices used to prevent rotation of threaded connector assembly.

BACKGROUND

Offshore oil and gas drilling operations typically include the make-up of strings of pipe or casing members, frequently of relatively large diameter. The tubular strings may be driven into the ground underwater to be used for anchoring the drilling platform. Such strings are also used as conduits in the water through which a well may be initiated. The joint between members of such tubular strings must provide both structural strength and fluid pressure integrity. Such features of a joint might be provided, for example, by welding. However, because welding is a time-consuming operation, and drilling rig rates are high, particularly offshore, mechanical connectors are generally preferred. Typical mechanical connectors available include threaded type connectors in which tubular members are mutually rotated to thread a pin and box connector assembly, breach block connectors, and snap lock connectors.

In threaded mechanical connector assemblies, an externally threaded end, known as the pin, mates with an internally threaded section, known as the box. The pin and the box on a threaded connector assembly are designed to be engaged with each other and rotated to a specific torque value for connecting the ends. After the connection is made, anti-rotation devices can be installed to secure the pin and the box together at the desired make-up torque. The anti-rotation devices are designed to ensure that the threaded portions of the connector assembly do not become loosened from each other in response to forces applied to the pipe or casing members in the string.

Existing anti-rotation devices often feature a mechanical key that can be selectively positioned in a recess between the pin and the box of the connector assembly to prevent rotation of the pin and the box relative to each other once the make-up torque is reached.

In addition, some existing anti-rotation keys are designed to interface very closely with the connector assembly to fill a recess therein. As such, these keys can be difficult to position in the corresponding recess and often must be hammered into engagement with the connector assembly using a large amount of force. This hammering process can be unsafe as it may require personal present on a drill floor. Further, such a process can take an undesirable amount of time and energy to ensure that the keys are lodged into their respective recesses in the connector assembly.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments, according to the present disclosure, may be directed to an improved anti-rotation key designed to prevent rotation of a first threaded portion of a connector assembly with respect to a second threaded portion of the connector assembly. The disclosed anti-rotation key includes several features that facilitate easier, faster, and more accurate securing of the key within the connector to prevent rotation of the threaded portions of the connector. For example, the anti-rotation key may include features that guide, pre-load, and smooth the transition of the key from an initial position to a fully engaged and energized position.

The presently disclosed anti-rotation key may include a tapered surface on one side and a surface having a plurality of teeth on the opposite side. The tapered surface is used to engage a tapered surface of the first threaded portion of the connector assembly, while the plurality of teeth are used to engage an engagement surface of the second threaded portion. Once the key is pushed into the recess, the teeth may engage the engagement surface of the second threaded portion to prevent rotation of the threaded portions relative to each other.

Figure 1A:
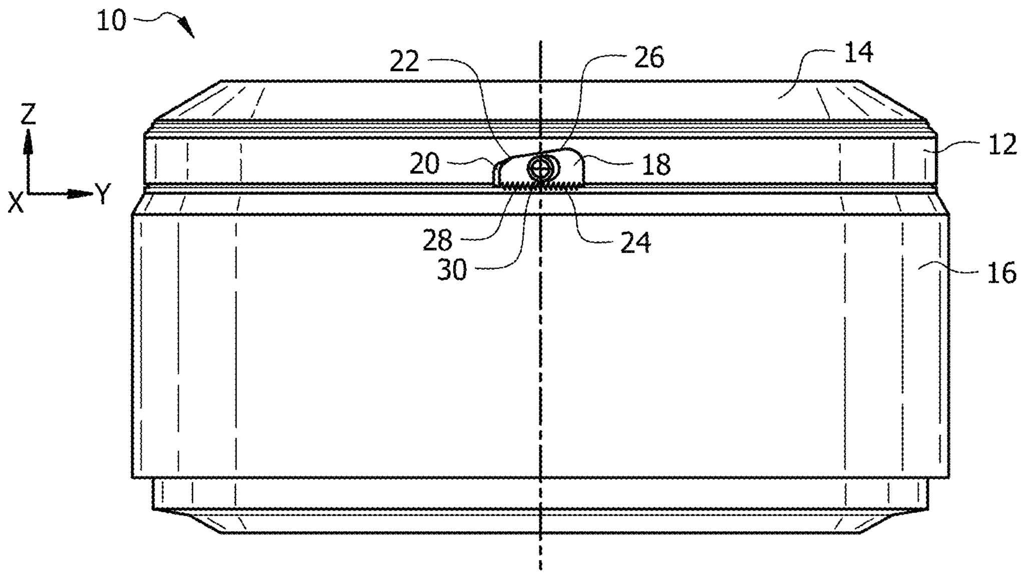
FIGS. 1A and 1B are front views of a connector assembly with an improved anti-rotation key going from an initial placement to an energized placement within the connector assembly, in accordance with an embodiment of the present disclosure.
Figure 1B:
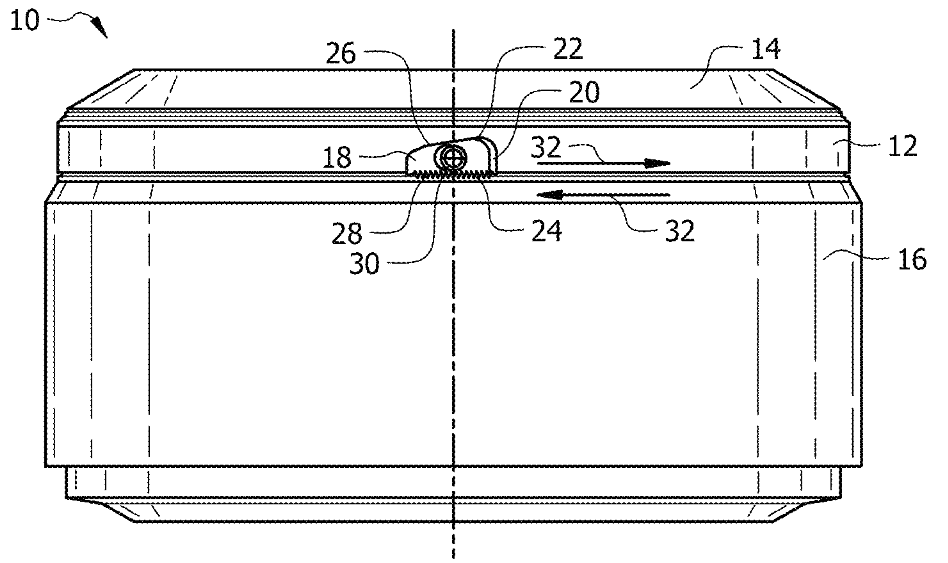

Turning now to the drawings, FIGS. 1A and 1B illustrate a system 10 that includes a connector assembly 12 with a first threaded portion 14 (which can be a pin) and a second threaded portion 16 (which can be a box) that may be secured in a desired rotational position relative to each other by an improved anti-rotation key 18. The first threaded portion 14 of the connector assembly 12 may be an externally threaded end, known as the "pin," while the second threaded portion 16 is an internally threaded section, known as the "box".

The pin and box are designed to be threaded together to connect a first tubular component (not shown) to a second tubular component (not shown). In some embodiments, the pin is formed into the first tubular component and the box is formed into the second tubular component, such that the connector assembly 12 is integral to the tubular components being connected. In other embodiments, the pin and the box may be separate components that are attached to their respective tubular components as desired to facilitate the connection. However, the present disclosure is not limited to any specific configuration of the pin and box relative to the tubular components being connected.

When forming these tubular connections using the connector assemblies 12, it is desirable to rotate the first and second threaded portions 14 and 16 relative to each other until the connector assembly 12 reaches a desired make-up torque. Upon reaching this make-up torque, the connection may be secured using one or more anti-rotation keys 18 to limit the threaded portions 14 and 16 from being rotated away from their designated make-up torque. In FIGS. 1A and 1B, only one such anti-rotation key 18 is illustrated, but it should be noted that in some embodiments any desirable number of keys 18 may be positioned within the connector assembly 12 to prevent further rotation of the threaded portions 14 and 16.

As illustrated, the anti-rotation key 18 may be selectively positioned within a recess 20 formed in the connector assembly 12 to lock the threaded portions 14 and 16 in a rotational position relative to each other. The recess 20 is defined by a tapered surface 22 formed into the first threaded portion 14 and an engagement surface 24 located on the second threaded portion 16. The illustrated recess 20 is designed to be generally longer than the key 18 in a longitudinal direction of the key 18 (parallel to the Y-axis), in order to facilitate self-guiding of the key from an initial position (FIG. 1A) to an energized position (FIG. 1B).

The anti-rotation key 18 generally includes a tapered surface 26 on one side. This tapered surface 26 is designed to engage with the tapered surface 22 of the first threaded portion 14. The anti-rotation key 18 may also include a row of several teeth 28 disposed on the opposite side of the key 18 from the tapered surface 26. The plurality of teeth 28 are designed to engage with the engagement surface 24 of the second threaded portion 16. As described in detail below, the plurality of teeth 28 on the key 18 may include teeth of various shapes, such as, for example, "angled" teeth, as further described below.

FIG. 1A shows the anti-rotation key 18 disposed in an initial loading position within the recess 20. The initial position may be any suitable location within recess 20 at which the key 18 is initially placed. At this point, the key 18 is not fully engaged with the connector assembly 12. A bolt 30 may be positioned through an aperture in the key 18 to couple the key 18 with the connector assembly 12. In various embodiments, one of the purposes of bolt 30 can be to retain the anti-rotation key 18 securely in place both before and during the make-up process. Typically, bolt 30 can be installed prior to assembling the illustrated X-axis. As the pin and box components, ensuring that key 18 remains in position throughout the procedure. This design enables the connection to be completed entirely hands-free, eliminating the need for manual adjustments during or after assembly.

From this position, the key 18 may be pressed further inward into the recess 20 (e.g., via the bolt 30 or some other tool) in a direction parallel to the illustrated X-axis.

In various embodiments, during the make-up procedure illustrated in FIG. 1B, the first threaded portion 14 and second threaded portion 16 of the connector assembly 12 are threaded together, with the first threaded portion 14 rotating into the second threaded portion 16 to achieve the desired make-up torque. As shown in FIG. 1B, arrows 32 indicate an example implementation where the first threaded portion 14 rotates counterclockwise while the second threaded portion 16 rotates clockwise relative to the first threaded portion 14. Note, that both threaded portions do not have to be rotated simultaneously. For example, one threaded portion can remain stationary while the other threaded portion is rotated relative to it.

It should be noted that the illustrated anti-rotation key 18 is a right-handed key designed to prevent left-handed turns (e.g., counterclockwise turns) of the first threaded portion 14 of the connector assembly relative to the second threaded portion 16. Such a left-handed turn is illustrated by arrows 32 in FIG. 1B. If the first threaded portion 14 moves relative to the second threaded portion 16 in a counterclockwise direction (the direction that breaks first threaded portion 14 from second threaded portion 16), the key 18 will apply at least a friction force to the first threaded portion 14 via the pre-loaded tapered surface 26 and the teeth 28 digging into the second threaded portion 16.

Further, a left-handed key can be also designed to prevent right-handed turns (e.g., clockwise turns) of the first threaded portion 14 of the connector assembly relative to the second threaded portion 16. If the first threaded portion 14 moves relative to the second threaded portion 16 in a clockwise direction (the direction that breaks the first threaded portion 14 from the second threaded portion 16), the key 18 will apply a stopping force to the first threaded portion 14 via the pre-loaded tapered surface 26 and the teeth 28 digging into the second threaded portion 16.

In some embodiments, it may be desirable for the connector assembly 12 to have at least one left-handed key 18 positioned therein and at least one right-handed key 18 positioned therein. This may prevent rotation of the threaded portions 14 and 16 relative to each other in either direction. These right- and left-handed anti-rotation keys 18 may be positioned at 180 or 90 degrees from each other around the circumference of the connector assembly 12. In other embodiments, a greater number of right- and left-handed keys 18 may be positioned and energized around the circumference of the connector assembly 12.

As this make-up process progresses, the teeth 28 of the anti-rotation key 18, which are positioned within the recess 20, may penetrate the engagement surface 24 of the second threaded portion 16. This penetration may ensure that the key 18 will self-transition into its energized position if the connection attempts to unbuck/breakout. In this energized state, the tapered surface 26 of the key 18 engages with the tapered surface 22 of the first threaded portion 14, while the teeth firmly penetrate the engagement surface 24 of the second threaded portion 16. This interaction effectively locks the first threaded portion 14 and second threaded portion 16 in place, preventing any relative unbucking/breakout rotation and maintaining the desired torque.

The term "energize" refers to the key 18 being brought into full engagement with the connector assembly 12. As the key 18 moves laterally relative to the connector assembly 12 into the smaller side of the recess 20, the tapered surface 26 of the key 18 may load against the tapered surface 22 of the first threaded portion 14 while the teeth 28 dig further into the engagement surface 24 of the second threaded portion 16. Upon reaching the energized position shown in FIG. 1B, the anti-rotation key 18 is fully engaged with the tapered surface 22 of the first threaded portion 14 and with the engagement surface 24 of the second threaded portion 16.

Thus, the disclosed anti-rotation key 18 is setup for additional self-energizing engagement as first threaded portion 14 and second threaded portion 16 are threaded into each other. Thus, the disclosed key 18 may enable the system 10 to be connected at a more accurate make-up torque than is possible with existing systems that require rotation of the connector to energize the key. In some cases, key 18 may be configured for the connector assembly 12 to exhibit at least some un-bucking before the connector assembly 12 increases resistance during a break-out process.

In various cases, a relationship between the taper, gap size, and teeth height of key 18 can affect the functionality and effectiveness of the anti-rotation key 18. The taper ensures proper alignment and forces of the key 18 during installation and allows for self-energization by progressively increasing engagement forces as the key 18 moves into its final position. The gap size may be defined as the spacing between the key and the lateral ends of recess 20. Additionally, the teeth height protrusion from the key 18 impacts the depth of penetration into the engagement surface 24, the resistance against rotational forces, and the interaction with the gap size. Excessive protrusion could complicate alignment or make achieving proper make-up difficult, while inadequate protrusion may reduce the effectiveness of the anti-rotation function. These parameters are balanced to achieve optimal performance, as further describe below.

It should be noted that variations on the illustrated system 10 may be used in other embodiments. For example, in other embodiments the pin and the box of the connector assembly 12 may be reversed, such that the box acts as the first threaded portion 14 having the tapered surface 22 and the pin acts as the second threaded connection 16 having the engagement surface 24.

Anti-Rotation Key Design

Figure 2:
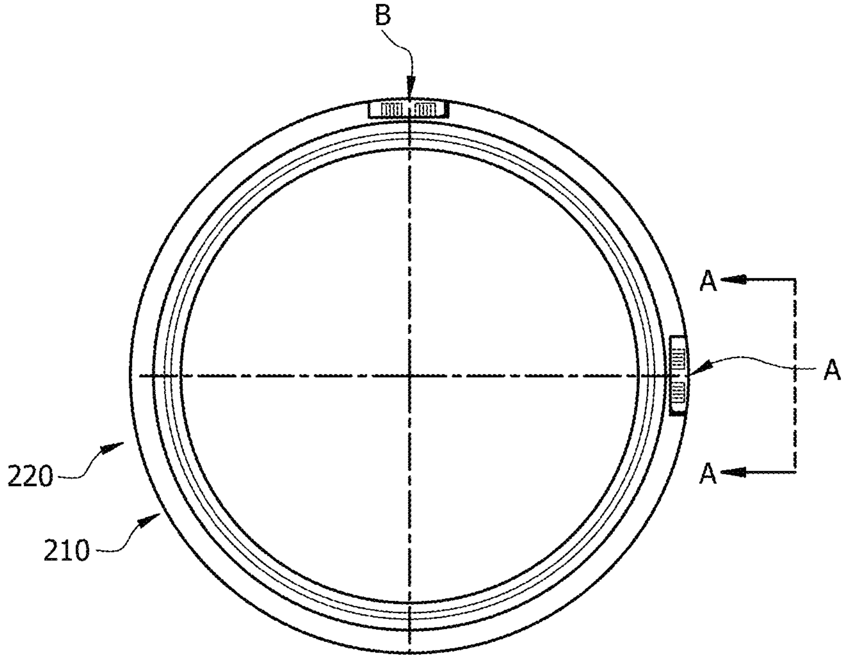
FIG. 2 is a top view of a connector assembly, in accordance with an embodiment of the present disclosure.

FIG. 2 shows a top view of a connector assembly featuring a pin 210 positioned above a box 220. In this example embodiment, two pockets are formed around the circumference of pin 210, such as along the rim. These pockets are specifically designed to accommodate anti-rotation keys, allowing them to be securely positioned to prevent unwanted rotation of the connection. The figure includes two pockets labeled A and B, which are strategically placed around the circumference of pin 210. The selected distribution of pockets A and B along a circumference provides various options for anti-rotation key placement. In some cases, more than two pockets for keys can be used. Alternatively, in some cases a single pocket can be used. As shown in FIG. 2, keys A and B, are positioned at 90 degrees from each other around the circumference of the connector assembly 12. In some cases, one key may be right-handed while the other is left-handed. Alternatively, both keys may be configured as either right-handed or left-handed.

The anti-rotation keys can be attached at different locations depending on the desired configuration and operational requirements. The pockets can be located on either the top portion of pin 210 or the bottom portion of box 220 of the connector assembly. This design enables the anti-rotation keys to engage with opposing friction surfaces. For example, if an anti-rotation key is inserted into a pocket on pin 210, its teeth are configured to engage with the friction surface of box 220. Conversely, if the anti-rotation key is placed in a pocket on box 220, its teeth will engage with the outer surface of pin 210. The teeth on the anti-rotation keys are designed to "bite" into these opposing surfaces, providing effective resistance against rotational forces.

Figure 3:
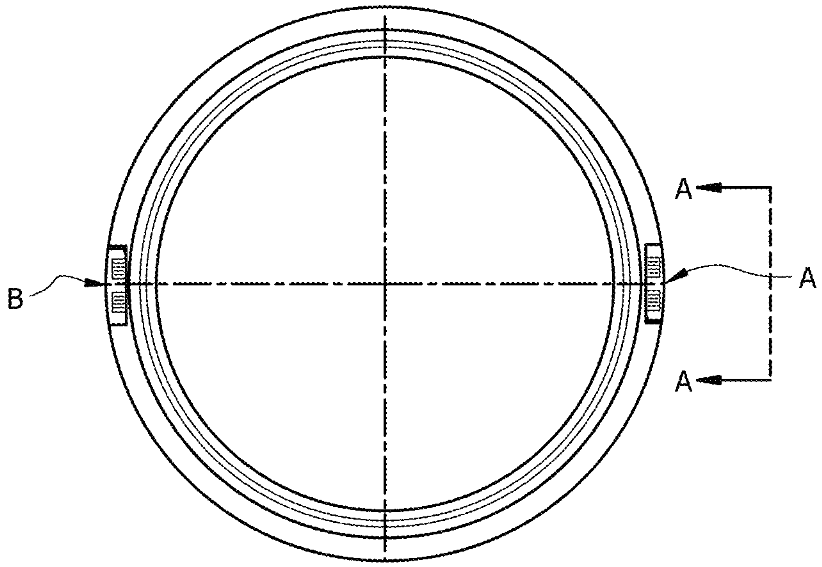
FIG. 3 is another top view of a connector assembly, in accordance with an embodiment of the present disclosure.

FIG. 3 shows a similar configuration of keys A and B, but when keys A are positioned at 180 degrees from each other around the circumference of the connector assembly 12.

Figure 4A:
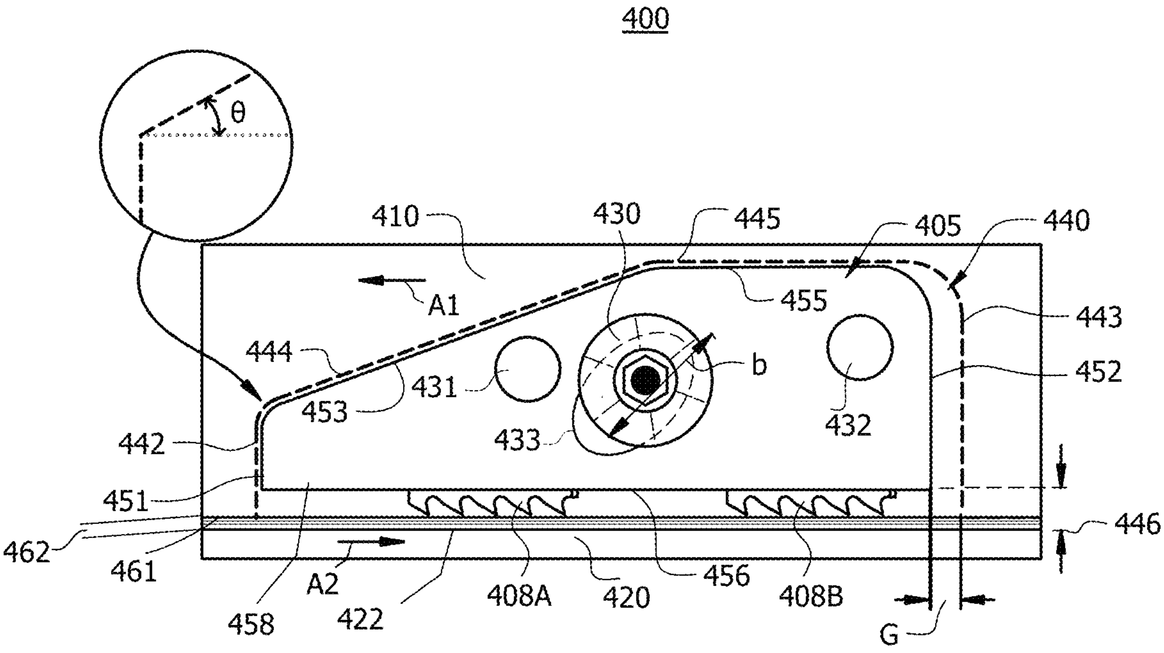
FIG. 4A is a side view of a configuration of an anti-rotation key relative to a connector assembly partially made up, in accordance with an embodiment of the present disclosure.

FIGS. 2 and 3 also show a cross-sectional cut A-A performed along an extension of a pocket such as a pocket A. FIG. 4A shows a view of a connector assembly 400, which includes the cross-sectional view A-A of an example anti-rotation key 405.

As illustrated in FIG. 4A, the connector assembly 400 is designed to securely join two sections, pin 410 and box 420, ensuring they remain locked in place without rotation once fully engaged. Pin 410, which serves as the upper component of the assembly, is configured to allow clockwise rotation, as indicated by the arrow A1, during the make-up process with box 420, while box 420 is configured to allow rotation relative to pin 410 counterclockwise as indicated by the arrow A2. As described above, the term "make-up" refers to the procedure of assembling or tightening the two components of the connector, typically a pin and a box, by rotating them relative to each other. During make-up, pin 410, the male threaded component, is inserted into box 420, the female threaded component, and rotated to engage the threads of both parts. This rotation causes the threads to interlock, drawing the components closer together to form a secure and tight connection. The surface of box 420 provides the interface against which the anti-rotation key engages, with its teeth embedding into the surface to effectively prevent any unwanted rotational movement."

FIG. 4A shows anti-rotation (AR) key 405 before pin 410 and box 420 are made-up. Anti-rotation key 405 is positioned within a pocket 440 (herein, pocket 440 is also referred to as recession) of connector assembly 400 to lock pin 410 and box 420 together, preventing any undesired rotation, such as un-bucking, upon making up the assembly.

Pocket 440 includes an activation shoulder 442, an engagement slope 444, a top shoulder 445, and a back shoulder 443, all of which are surfaces designed to engage with corresponding surfaces on the AR key 405. In other embodiments, there may be more than one activation shoulder 442, top shoulder 445, back shoulder 443, and combinations thereof disposed along the body of the AR key 405. In such embodiments, the more than one activation shoulder 442, top shoulder 445, back shoulder 443, and combinations thereof may engage with respective portions of pocket 440. As shown in FIG. 4A, AR key 405 features a front surface 451 that, in some cases, can be configured to engage with the activation shoulder 442, an inclined surface 453 designed to engage with the engagement slope 444, a top surface 455 of AR key 405 is configured to engage with top shoulder 445, a back surface 452 intended to engage with the back shoulder 443 and a bottom surface 456 configured to engage with a friction surface 422 of box 420 via teeth 408A and 408B. Note that, as the pin 410 and box 420 are not yet fully made-up, the rim 461 of the pin 410 has not yet contacted the friction surface 422, which also serves as the contact surface of the box 420 with rim 461. Additionally, the threaded section 462 of the pin 410 is visible, indicating that it is in the process of being threaded into the corresponding threaded receiving portion of the box 420. Further, a front face 458 of AR key 405 is facing outwards, as indicated in FIG. 4A. As illustrated in FIG. 4A, before the make-up process, front surface 451 of AR key 405 may be positioned adjacent to activation shoulder 442, and inclined surface 453 may be aligned with engagement slope 444. As shown in FIG. 4A, the inclined surface 453 is inclined at angle θ, which can range between about ten degrees to anywhere between about forty degrees to sixty degrees. Additionally, back surface 452, as shown in FIG. 4A, may not contact back shoulder 443 before make-up, and form a gap G, as shown in FIG. 4A. In some cases, however, such gap G may not be present, depending on specific design and size of AR key 405. Back surface 452 is configured to engage with the back shoulder 443 (i.e., come into contact) once the connector assembly 400 is fully made up.

Figure 4B:
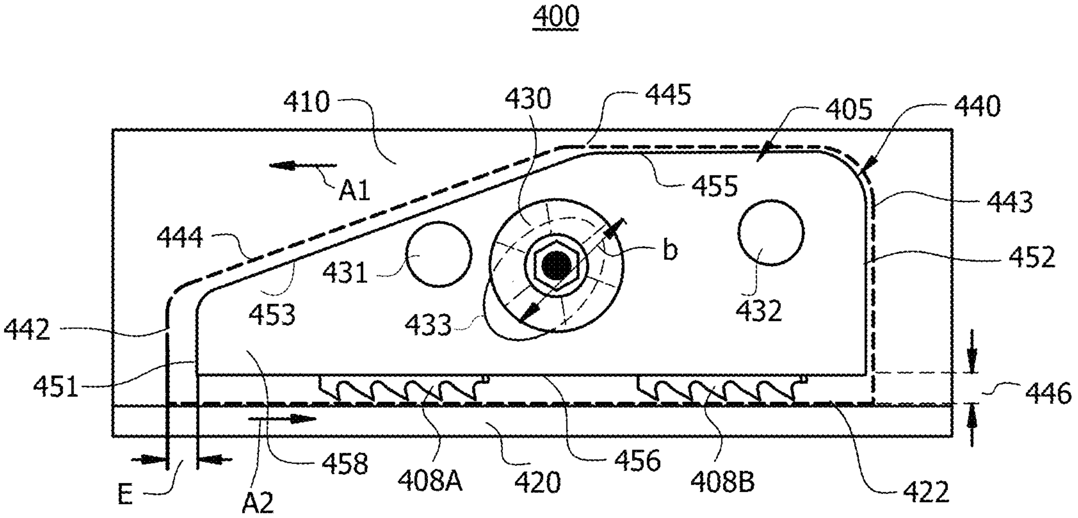
FIG. 4B is a side view of another configuration of an anti-rotation key relative to a connector assembly partially made up, in accordance with an embodiment of the present disclosure.

In certain instances, AR key 405 may be positioned as illustrated in FIG. 4B prior to the make-up procedure. In this configuration, gap E is present between the activation shoulder 442 and the front surface 451, with the AR key 405 shifted toward the back shoulder 443. Note that existence of this gap E allows further engagement of AR key 405 teeth into box 420 when the connector tries to un-buck as the inclined surface 453 drives AR key 405 into friction surface 422 of box 420.

It is worth noting that the exact position of AR key 405 before make-up is not critical, as the AR key 405 is designed to flexibly shift along the axis between the activation shoulder 442 and the back shoulder 443.

In various cases, teeth 408A and 408B are designed to engage with the surface of box 420 and are also referred to as gripper inserts. Teeth 408A and 408B can be made from any suitable material such as steel, high carbon steel, aluminum alloy, a nickel-chromium alloy, and the like. In embodiments, teeth 408A and 408B may comprise of a material having a higher yield strength compared to the body of the AR key 405. As the connector assembly 400 is tightened, teeth 408A and 408B bite into the surface of box 420, enhancing the mechanical grip and preventing rotational slippage. These teeth can be modular elements that are removable or insertable into the body of AR key 405. For instance, the body of AR key 405 can have a first opening or recess for inserting teeth 408A and a second opening or recess for inserting teeth 408B. In one example implementation, the teeth can be configured to slide into a recess within the body of an AR key.

Figure 4C:
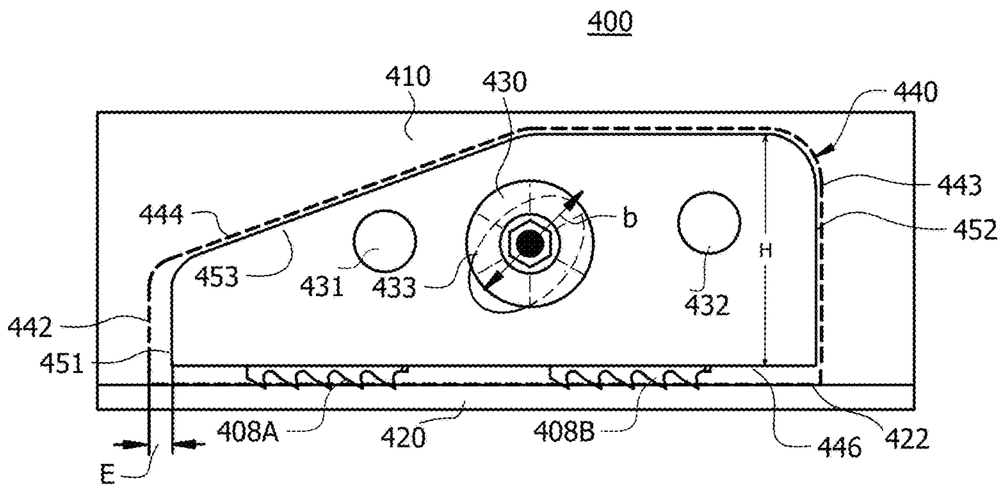
FIG. 4C is a side view of an anti-rotation key while a connector assembly is made up, in accordance with an embodiment of the present disclosure.
Figure 4D:
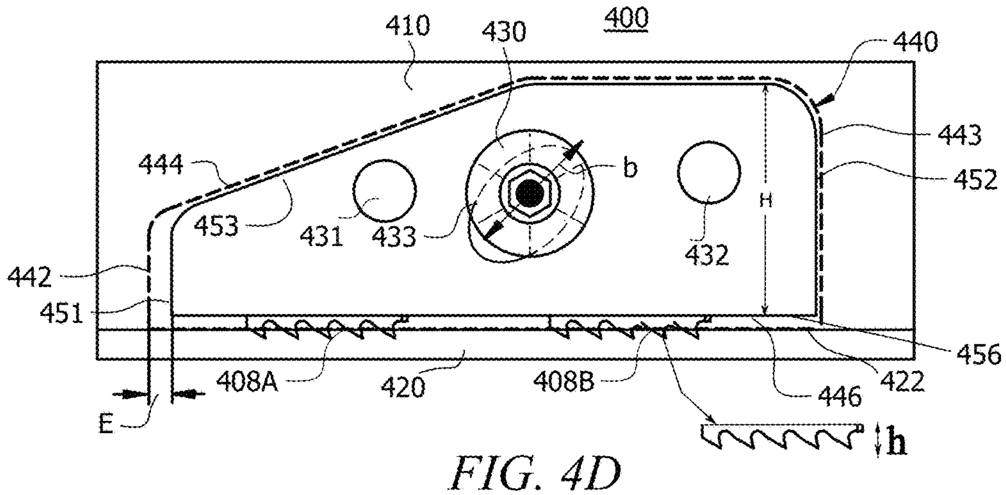
FIG. 4D is a side view of an anti-rotation key after a connector assembly is made up, in accordance with an embodiment of the present disclosure.
Figure 4E:
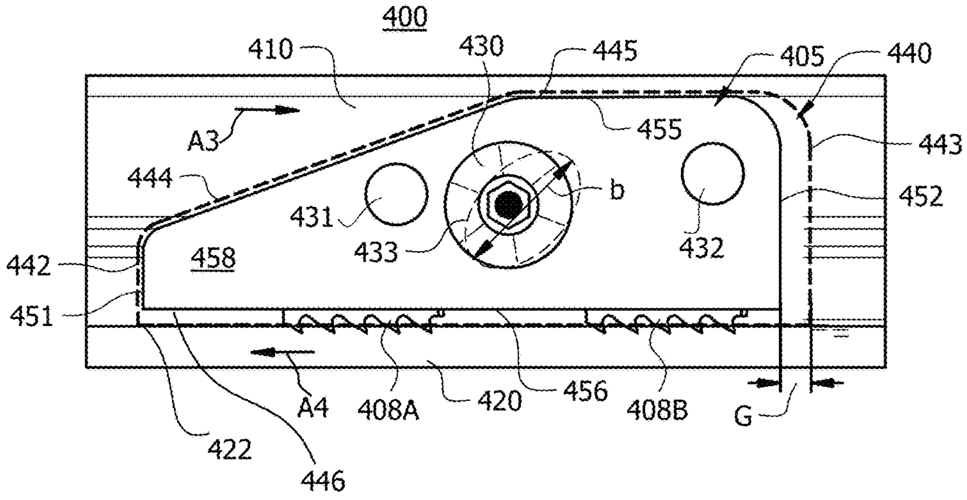
FIG. 4E is a side view of an anti-rotation key after full self-energization and resisting break out of a connector assembly, in accordance with an embodiment of the present disclosure.
Figure 4F:
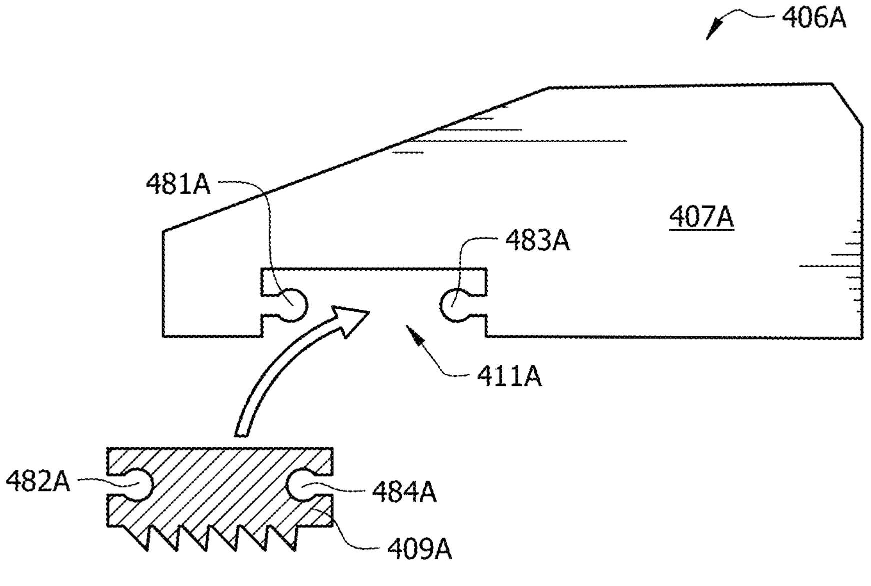
FIG. 4F is an example embodiment of an anti-rotation key, in accordance with an embodiment of the present disclosure.
Figure 4G:
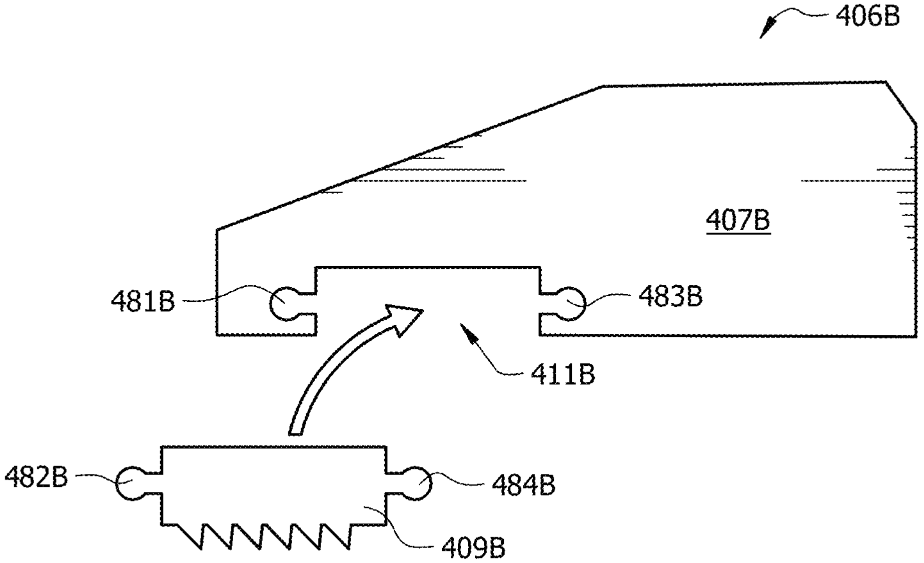
FIG. 4G is another example embodiment of an anti-rotation key, in accordance with an embodiment of the present disclosure.

FIG. 4F illustrates an example of AR key 406A, which includes a body 407A and a recess 411A into which teeth 409A can be inserted. In this implementation, recess 411A may include coupling extensions 481A and 483A designed to engage with corresponding slots 482A and 484A, allowing teeth 409A to slide securely into recess 411A. It should be noted that the implementation of teeth 409A and body 407A is just one possible design for an AR key; various other configurations can be utilized. For example, FIG. 4G shows another example of AR key 406B, which includes a body 407B and a recess 411B into which teeth 409B can be inserted. In this implementation, recess 411B may include coupling slots 481B and 483B designed to engage with corresponding extensions 482B and 484B, allowing teeth 409B to slide securely into recess 411B. In some cases, body 407A or body 407B may include snap-fit elements allowing for teeth 409A to snap-fit into the recess 411B.

Figure 5A:
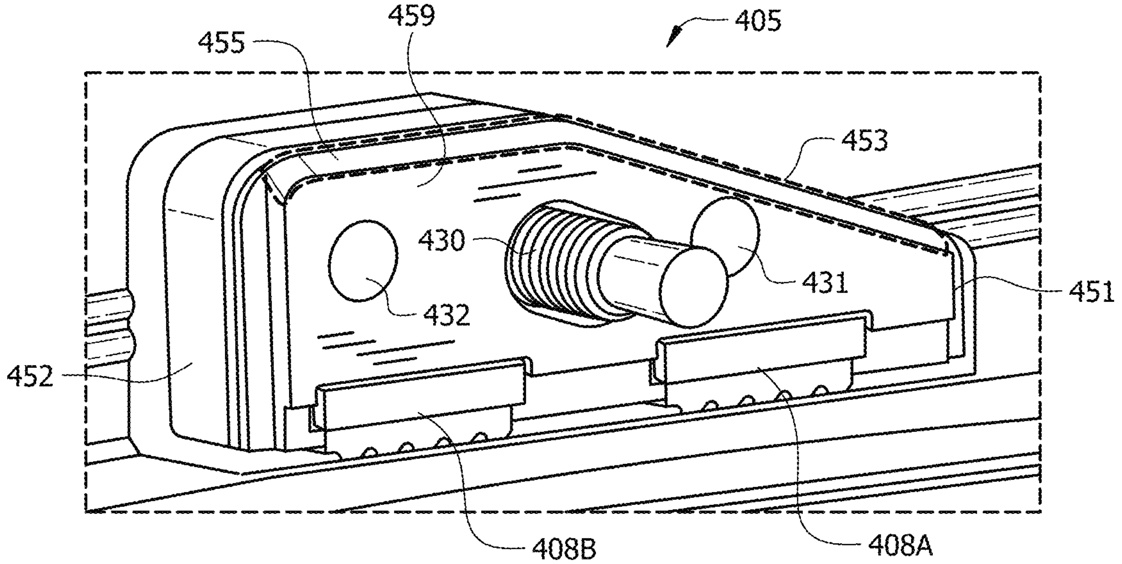
FIGS. 5A and 5B are isometric views of an anti-rotation key, in accordance with an embodiment of the present disclosure.

In FIGS. 4F and 4G, the connection of teeth 409A and teeth 409B within their respective bodies 407A and 407B demonstrates one possible implementation of the coupling between the teeth and the anti-rotation key bodies. It should be noted that these particular configurations are just examples of how the coupling between the teeth and the body can be implemented, and other coupling methods can be used. For instance, coupling elements may include snap-fit mechanisms, dovetail joints, tongue-and-groove connections, threaded fasteners, interlocking tabs, friction-fit mechanisms, or locking pins. These alternatives provide flexibility in the design of the anti-rotation key, allowing for various configurations depending on the application requirements. Furthermore, in some configurations, such as shown in FIG. 5A, teeth 408A and 408B may be configured to be inserted from an inside side of AR key 405, and face 458 (referring to FIG. 4A) may not have openings, such that teeth 409A and 409B may not be retrieved from AR key 405, while key 405 is installed and retained in either the box 420 or pin 410.

In different scenarios, the teeth can serve as any suitable gripper inserts, with their specific design dictated by the size and material of pin 410 and box 420, as well as the required preset torque between pin 410 and box 420. These gripper inserts may be attached to the body of an AR key using various methods, such as bolts or other suitable fasteners.

Returning to FIGS. 4A and 4B, friction surface 422 of box 420 is a designated surface where the gripper inserts of the anti-rotation key engage. In various embodiments, bottom surface 456 is configured to face friction surface 422. Friction surface 422 allows AR key 405 to maintain the necessary grip with box 420 to resist any rotational movement between pin 410 and box 420. Key spacing 446 represents the slight separation that exists before teeth 408A and 408B fully engage with friction surface 422 during the make-up process. Key spacing 446 (in addition to an interference distance mentioned below) allows for the initial alignment and positioning of AR key 405 and provides some flexibility for the components to move slightly as they are being tightened. Key spacing 446 ensures that, as the connection is tightened further, teeth 408A and 408B will effectively embed into friction surface 422, providing the necessary anti-rotation effect (wherein the distance the teeth 408A and 408B embed into friction surface 422 may be referred to as an interference distance).

In some cases, openings 431 and 432 are designed to facilitate removal of parts (i.e., the key 405) without damaging the assembly, thereby simplifying maintenance. The openings also enable straightforward disassembly and maintenance of the anti-rotation key 405 without affecting other components of the connector assembly. In various embodiments, openings 431 and 432 may be designed to accommodate self-tapping screws. These self-tapping screws can be inserted into openings 431 and 432 and, upon reaching the back wall of pocket 440, can apply a force that pushes the AR key 405 out of pocket 440. This force is directed normally to the back wall of pocket 440, effectively ejecting the AR key 405 in a direction perpendicular to the back wall (e.g., out-of-the-page direction). Self-tapping screws eliminate the need to pre-thread openings 431 and 432, thereby reducing the manufacturing cost of the AR key 405.

In various embodiments, during the removal of AR key 405, the teeth 408A and 408B may remain as part of the connection assembly, while the portion of AR key 405 that does not include the teeth (the body of AR key 405) is removed. In this approach, the body of AR key 405 slides in a normal direction to the back wall of pocket 440 of pin 410, exiting in a normal direction out of pocket 440 and moving relative to teeth 408A and 408B, which remain engaged with friction surface 422. The removed body of AR key 405 can be reused with a different set of teeth, if required. Furthermore, the body of AR key 405 can be reinserted over teeth 408A and 408B if needed. By enabling teeth 408A and 408B to slide smoothly relative to the key 405, the removal process is simplified, minimizing potential damage to all components, including the pin 410 and box 420. This ease of removal is an intentional aspect of the design.

FIG. 4C illustrates the position of the AR key 405 while the connection is fully made up. FIG. 4C shows a configuration prior to any undesired motion for the connection to un-buck during use. In this configuration, the front surface 451 of the AR key 405 has an activation gap E with the activation shoulder 442, while the inclined surface 453 aligns with the engagement slope 444. It is important to note that the back surface 452 is now adjacent to and, in most cases, pushes into the back shoulder 443. In this energized position, box 420 moves up towards AR key 405, allowing teeth 408A and 408B to engage with friction surface 422. As shown, teeth 408A and 408B are positioned below friction surface 422 by a distance (i.e., an interference distance). While the connection is being made up, the key spacing 446 is decreasing upon pin 410 threading into box 420.

In various embodiments, size and shape of pocket 440 can be adjusted to control the interference distance with the gripper teeth relative to friction surface 422. For example, height H can be adjusted to control the vertical preload and penetration of teeth 408A and 408B with each degree of rotation until the activation gap is closed.

Additionally, as the AR key 405 engages with the back shoulder 443, the position of bolt 430 relative to opening 433 shifts, such that opening 433 moves towards back shoulder 443. It is important to note that the bolt 430 remains in a fixed position, determined by its tapped hole in pin 410, while the AR key 405 moves relative to bolt 430. In various cases, bolt 430 secures AR key 405, ensuring that it remains firmly in place (e.g., does not disengage or fall out of pocket 440) during the make-up procedure or handling of loose joints prior to make-up. During operations, AR key 405 may translate linearly with respect to the pocket 440 (i.e., AR key 405 does not rotate about bolt 430).

FIG. 4D illustrates the AR key 405 after the connection has been fully made up. In this configuration, the key spacing 446 is significantly reduced, reaching its minimal value. In some instances, surface 456 may make substantial contact with surface 422, effectively eliminating the key spacing 446. Alternatively, a small key spacing 446 may remain, as shown in FIG. 4D. In various embodiments, this key spacing 446 must be smaller than the height h of teeth 408A and 408B, as shown in FIG. 4D. Further, the dimension of height h of teeth 408A and 408B is relevant to ensure there is enough mechanical grip to actuate AR key 405 during breakout or prevent slippage before AR key 405 can fully actuate. There may be certain dimensions disclosed that are interrelated with others. For example, there may be a first distance from top surface 455 to a distal point of gripper teeth 408A and 408B. There may be a second distance is top shoulder 445 to rim 461. A third distance may be defined as the first distance minus the second distance, which is the teeth projection that will be engaged into surface 422 upon make-up of the connector with rim 461 and surface 422 in-contact. This penetration may be the initial engagement that setups up the AR key 405 to bite into surface 422 more as gap E is closed to zero. Once gap E is zero, the full break-out resistance may be realized and pin 410 and box 420 will not move relative to each other until something yields/breaks.

FIG. 4E shows a position of AR key 405 during a break-out. Note that as connector assembly 400 attempts be unmade, as indicated by break-out arrows A3 and A4, teeth 408A and 408B are configured to prevent the break-out by engaging with surface 422. This demonstrates the activation of the AR key's desirable anti-rotation properties, which serve to resist unintended un-bucking. During intentional or desired un-bucking, the AR key 405 would be removed. Upon break-out, AR key 405 moves towards activation shoulder 442, such that front surface 451 is pushed against activation shoulder 442. As AR key 405 moves towards activation shoulder 442, a gap G is formed between back surface 452 and back shoulder 443. Further, as box 420 breaks out from pin 410 a gap between surface 456 and 422 increases until teeth 408A and 408B disengage from surface 422. Note that the AR key 405 is specifically designed to resist disengagement. However, unintentional disengagement may still occur if the break-out forces or vibrations exceed the tested capacity of the AR key 405.

Figure 5B:
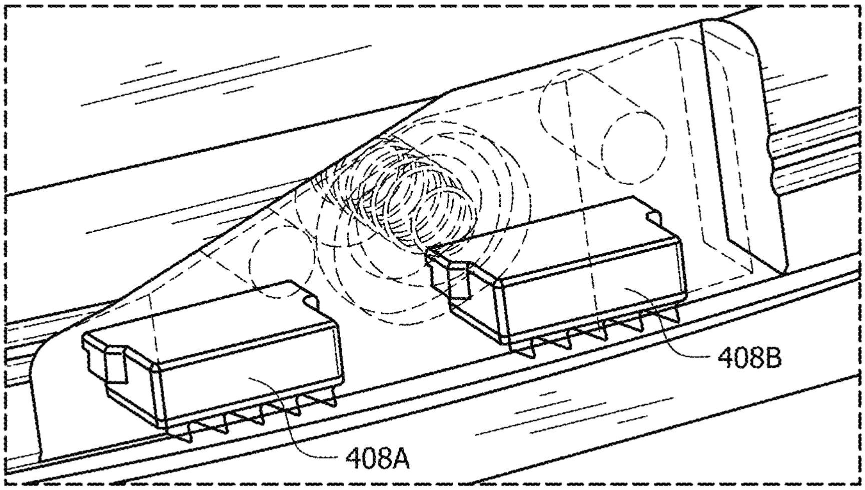

FIGS. 5A and 5B provide isometric views of the AR key 405. FIG. 5A displays an isometric view from the interior side of the AR key 405, highlighting teeth 408A and 408B, front surface 451, back surface 452, inclined surface 453, back face 459, bolt 430, and openings 431 and 432, as previously described. FIG. 5A also shows that the top surface 455 may be tapered. Such tapered surface 455 causes back face 459 to have a smaller area than the area of front face 458.

FIG. 5B presents a transparent, or ghosted, view of the AR key 405. In this view, teeth 408A and 408B are depicted as gripper inserts, which are components that can be inserted, removed, or replaced with different configurations of teeth for the AR key 405. This flexibility allows for customization of the AR key's engagement characteristics depending on the specific requirements of connector assembly 400. This increased flexibility facilitates the easier removal of the key 405 while also reducing the risk of dragging damage to surface 422 during its extraction from the assembled or secured pin 410 and box 420.

Figure 6:
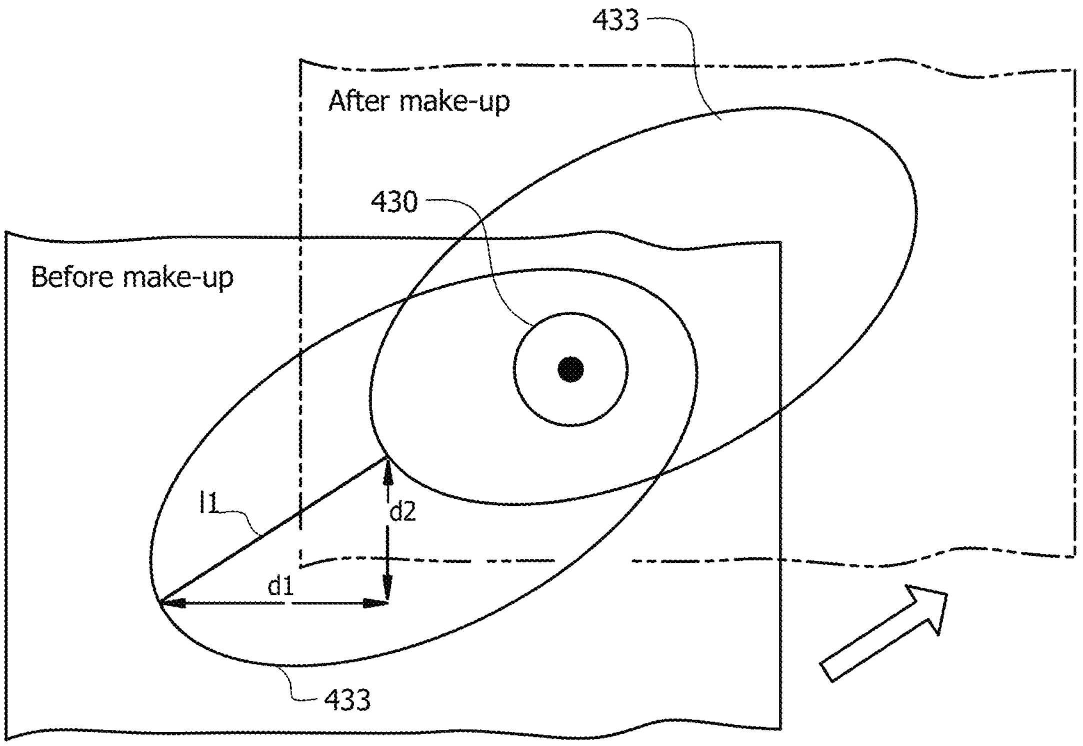
FIG. 6 is a diagram illustrating the movement of an elliptical opening during a connector assembly being made up, in accordance with an embodiment of the present disclosure.

In various embodiments, opening 433 is positioned to provide access to a tapped hole designed to receive bolt 430. It should be noted that opening 433 is larger than the diameter of bolt 430, allowing for relative movement of AR key 405 with respect to bolt 430. In some instances, opening 433 may have any curvilinear shape, such as an elliptical or oval shape. For example, as shown in FIG. 4A, opening 433 features an elliptical shape, with its major axis b angled relative to friction surface 422, permitting displacement of opening 433 relative to bolt 430 in both vertical and horizontal directions. The angle of the major axis b can be selected based on the expected displacement in these directions. For instance, as shown in FIG. 6, if the horizontal displacement is d1 and the vertical displacement is d2, the angle for the major axis b can be calculated as atan(d2/d1). FIG. 6 illustrates how opening 433 shifts due to the lateral and vertical movement of AR key 405, while bolt 430 remains stationary. As shown, opening 433 moves laterally by distance d1 and vertically by distance d2. To accommodate such movement, the major axis b of opening 433 must have a length of more than 11, where $11=\sqrt{(d1^2+d2^2)}$. The minor axis a of opening 433 is determined by ensuring that the smallest curvature k of opening 433 satisfies the relation $k=b/a^2=1/r$, where r is the radius of bolt 430, yielding $a=\sqrt{br}$. Furthermore, radius of bolt 430 has to be added to a minimum estimate for 11 of $\sqrt{(d1^2+d2^2)}$ resulting in minimal estimate for 11 to be $\sqrt{(d1^2+d2^2)}+r$.

Figure 7A:
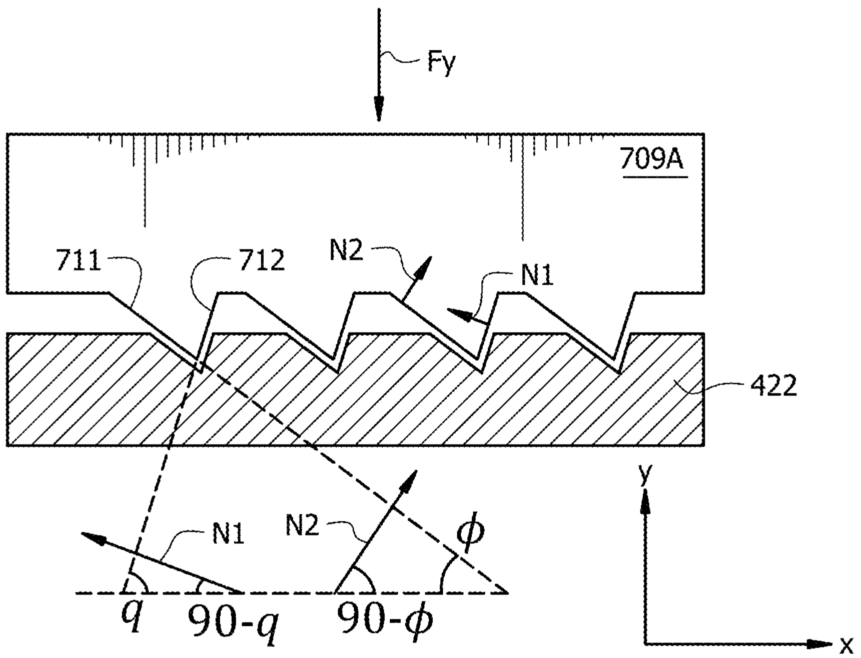
FIGS. 7A and 7B show example teeth profiles and forces that can be acted on such teeth, in accordance with an embodiment of the present disclosure.

FIG. 7A further illustrates how a downward force, Fy, applied to teeth 709A can result in a net force pushing the teeth forward due to interaction with friction surface 422. The downward force Fy must be balanced by the normal forces N1 and N2, which are directed perpendicular to the teeth sides 711 and 712, respectively. Therefore, Fy is calculated as $Fy=N1 \sin(90°-q)+N2 \sin(90°-\phi)$, which simplifies to $Fy=N1 \cos(q)+N2 \cos(\phi)$. Additionally, the force in the lateral direction (x-direction, as shown in FIG. 7A) is given by $Fx=N1 \cos(90°-q)+N2 \cos(90°-\phi)$, which simplifies to $Fx=N1 \sin(q)+N2 \sin(\phi)$. Thus, the specific design of teeth 408A, including the selection of angles q and #, can significantly impact the force Fx in the lateral direction.

Figure 7B:
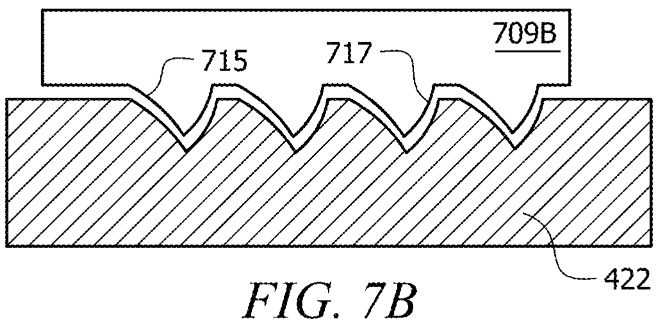

FIG. 7B shows an example profile of teeth 709B that includes curved surfaces 715 and 717. Such curved surfaces can be used to further control force Fx as teeth 709B are engaged with friction surface 422.

Figure 7C:
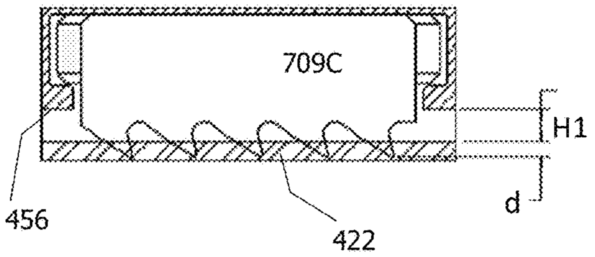
FIGS. 7C-7E show other examples of teeth profiles, in accordance with an embodiment of the present disclosure.
Figure 7D:
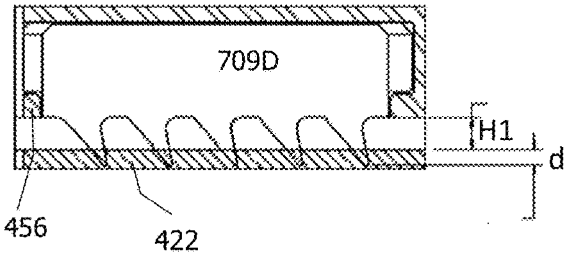

FIGS. 7C and 7D illustrate example teeth profiles 709C and 709D, respectively. In one embodiment, teeth 709D are designed with a slightly taller profile compared to teeth 709C. As shown in FIGS. 7C and 7D, both teeth profiles 709C and 709D penetrate surface 422 by a distance d while maintaining surface 456 above surface 422 by a distance H1. Both d and H1 are fractions of an inch, with d being a fraction of H1. For example, teeth 709C and 709D can be configured such that d is a few hundredths of an inch, while H1 is approximately a tenth of an inch, half of a tenth of an inch, and the like.

Figure 7E:
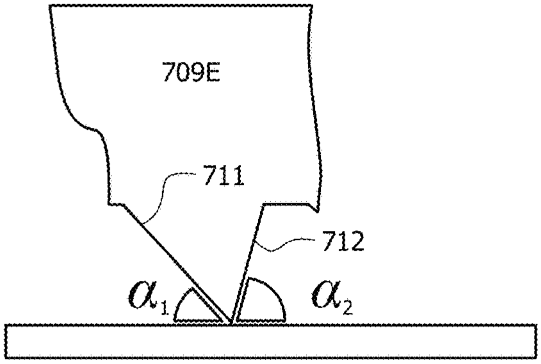

FIG. 7E shows an example tooth profile 709E that includes a first side 711 and a second side 712. In various embodiments, the first side may have an inclination angle $\alpha_1$ while the second side may have an inclination angle $\alpha_2$. In some embodiments, the inclination angle $\alpha_1$ is configured to be less than the inclination angle $\alpha_2$. For example $\alpha_1$ can range between 10 and 50 degrees, while $\alpha_2$ can range between 30 and 120 degrees. In some cases, $\alpha_2$ is selected to be larger than 90 degrees. For example, $\alpha_2$ can be selected to be 95, 100, 105, 100, 115, 120, 125, 130 degrees, or have similar values.

Figure 8:
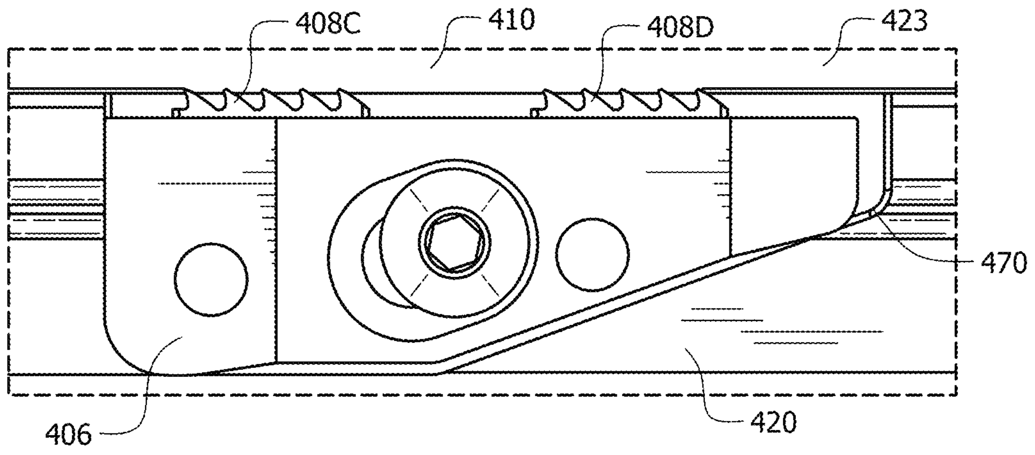
FIG. 8 is a side view of an anti-rotation key disposed in a recess of a second threaded portion, in accordance with an embodiment of the present disclosure.

FIG. 8 illustrates a configuration where AR key 406 is installed within a pocket 470 that is made in box 420, rather than in the pin 410 as in previous designs. In various embodiments, AR key 406 is configured to be similar to AR key 405. In an example implementation, AR key 406 may be a mirror image of AR key 405. In the configuration shown in FIG. 8, the AR key interacts directly with box 420, allowing for a different arrangement of the anti-rotation mechanism. The figure shows that teeth 408C and 408D of AR key 406 are positioned such that they engage with frictional surface 423 of pin 410. The configuration shown in FIG. 8 provides an alternate method of preventing rotation by having AR key 406 interact with surfaces forming pocket 470 within box 420.

Figure 9A:
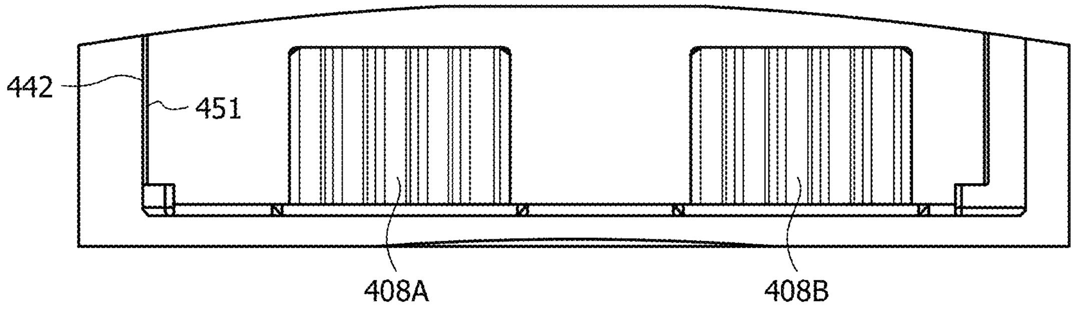
FIG. 9A shows views of an anti-rotation key prior to a connection assembly being made up, in accordance with an embodiment of the present disclosure.
Figure 9B:
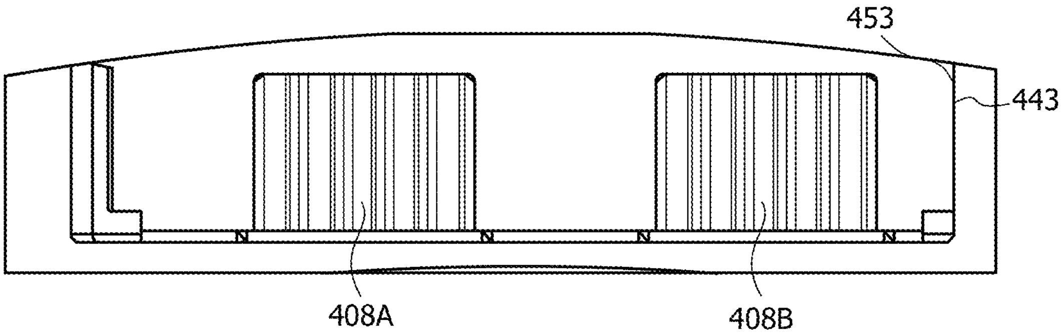
FIG. 9B shows views of an anti-rotation key after a connection assembly is made up and activated, in accordance with an embodiment of the present disclosure.

FIGS. 9A and 9B provide bottom views of AR key 405, highlighting the side with teeth 408A and 408B. FIG. 9A shows AR key 405 either prior to made-up configuration or during a break-out configuration. Such configuration matches FIGS. 4A and 4E of this disclosure, for which the front surface 451 of AR key 405 is in contact with activation shoulder 442. In contrast, FIG. 9B illustrates AR key 405 in its energized made-up configuration, with the back surface 453 fully engaged with the back shoulder 443, similar to configuration shown in FIGS. 4B-4D.

Dimensions for Components of Anti-Rotation Key

In various embodiments, a thread pitch of connector assembly 400 can be about 0.25 inches, and the outer diameter (OD) of connector assembly can be between 23-24 inches. It should be noted that OD of connector assembly is not limited to 23-24 inches and other connectors can be used. Further thread pitch can be different from 0.25 inches. In various embodiments, the connectors could be any diameter and pitch but may require the geometry of such connectors to be tuned for the given diameter size and thread pitch. These dimensions can dictate the overall size of a pocket within pin 410 and/or box 420 within the connector assembly 400. The thread pitch influences the number of threads per inch, which affects how the pin and box engage during the make-up process. A larger OD helps accommodate a larger AR key 405 and ensures sufficient surface area for the teeth 408A and 408B to grip friction surface 422, providing a secure connection.

In some cases, key spacing 446 at make-up is specified as a fraction of an inch. For example, key spacing 446 can be about 0.01, 0.015, 0.017, 0.02, and similar dimensions in inches. Proper key spacing 446 is important to ensure that the AR key 405 engages effectively with the friction surface 422 after make-up, to prevent any unwanted rotation between pin 410 and box 420. An interference of 0.017 inches indicates that a snug fit can be accomplished after make-up that enhances the mechanical grip of the AR key 405 within the friction surface 422.

In various embodiments, teeth penetration at different levels of interference spacing during loading up can be evaluated to determine a suitable design for AR key 405 and pocket 440. Table 1 below further shows relation between shoulder angle θ, as shown in FIG. 4A, horizontal movement of AR key 405, and interference spacing between AR key 405 and friction surface 422, as well as angle of rotation between pin 410 and the box 420 and gap change between pin 410 and box 420.

TABLE 1

| Shoulder Angle (°) | Horizontal Movement of Key (in) | Teeth Interference (in) | Angle (Pin/Box) (°) | Gap (Pin/Box) (in) |
|---|---|---|---|---|
| 20 | 0 | 0.017 | 0 | 0 |
| 20 | 0.05 | 0.035 | 0.24 | 0.0002 |
| 20 | 0.075 | 0.044 | 0.36 | 0.0003 |
| 20 | 0.1 | 0.053 | 0.48 | 0.0003 |
| 20 | 0.145 | 0.07 | 0.7 | 0.0005 |

In various embodiments, implementations of AR key are designed to prevent the rotation of a first threaded portion, such as pin 410, of a connector assembly relative to a second threaded portion, such as box 420.

It should be noted that the shoulder angle θ plays a role in distributing pressure between the front teeth 408A and the back teeth 408B, as illustrated in FIG. 4A. For instance, with shallow shoulder angles θ (e.g., a few tens of degrees), the front teeth 408A may experience increased pressure during the make-up process compared to the back teeth 408B In certain cases, this pressure increase occurs on front teeth 408A when a counterclockwise moment on the key 405 happens. The gap that would occur between top shoulder 445 and top surface 455 remains closed due to the induced moment in the key 405.

In various embodiments, an AR key includes a gripper insert, which is a removable or insertable element designed to interact with the friction surface on the second threaded portion. The purpose of this insert is to engage the surface with sufficient force to prevent relative movement between the two threaded portions. The body of the anti-rotation key is shaped with an inclined surface that is designed to engage an activation shoulder on the first threaded portion being inclined. The inclined surface and shoulder allow for proper alignment and force transfer during the assembly process. Adjacent to and partially overlapping a bottom surface opposite the inclined surface is a recess. This recess is a cavity within the body of the AR key designed to receive the gripper insert and hold it securely in place. The gripper insert engages with a friction surface of the second threaded portion, which is a surface (that can be, in some cases, textured or roughed) designed to increase friction and prevent slippage. Additionally, the body of the AR key contains an elliptical opening designed to accommodate a bolt. The bolt secures the anti-rotation key to the first threaded portion via a tapped hole, a threaded opening designed to receive the bolt. The opening in the key is elliptical, meaning it has both a major axis (longest diameter) and a minor axis (shortest diameter), which allows some flexibility of the bolt moving within such elliptical opening.

In various cases, the activation shoulder of the first threaded portion is configured to form an angle of approximately twenty degrees with the bottom surface of the AR key. The twenty-degree angle ensures the inclined surface of the key and the activation shoulder of the first threaded portion mate effectively, providing a secure fit that helps to transfer forces during the tightening (make-up) process of the connector assembly. It should be noted that the angle of twenty degrees is one possible example of implementation. In other implementations, the angle can be about 10 degrees, 15 degrees, 25 degrees, 30 degrees, 35 degrees, 40 degrees, 45 degrees, and the like. Furthermore, the angle can be in a range of 10 to 60 degrees including all the ranges and values in between.

In various embodiments, the elliptical opening has its major axis (b) oriented at an angle relative to the bottom surface. The AR key is designed to move by two displacements during the make-up process: a lateral displacement (d1) along the bottom surface and a vertical displacement (d2) perpendicular to the bottom surface. The angle of the major axis can be calculated using the formula atan(d2/d1).

Further, in various embodiments, the length of the major axis b is at least the square root of the sum of the squares of the lateral displacement d1 and vertical displacement d2. The minor axis (a) is at least the square root of the product of the major axis length and the radius of the bolt. This calculation ensures that the elliptical opening provides the correct amount of clearance for the bolt while allowing for some movement of the anti-rotation key during the make-up process.

In various cases, the lateral displacement (d1) is between about two-hundredths to about two-tenths of an inch. Further, the angle calculated as a tan(d2/d1) is selected from a range of about ten to about sixty degrees.

In various embodiments, the gripper insert includes a set of teeth designed to engage the friction surface on the second threaded portion. These teeth can be configured to penetrate the surface by an interface spacing between 0 to about 0.2 inches, which represents the depth at which the teeth dig into the friction surface to create a secure hold. The depth of penetration affects the ability of the teeth to resist rotational forces and ensure the components remain locked together.

In various embodiments, a recess in the body of the AR key, such as recess 411A or recess 411B, as shown in respective FIGS. 4F and 4G, has a first set of coupling elements, which are configured to interlock with a second set of coupling elements on the gripper insert. When the gripper insert is placed into the recess, the coupling elements engage to hold the insert securely in place. This ensures that the gripper insert does not move or become dislodged during the make-up or break-out of the connector assembly.

In various cases, the AR key can have multiple gripper inserts and recesses. Specifically, the AR key can have two recesses and two gripper inserts, the first gripper insert, as shown in FIG. 5B, for example, positioned near a front surface of the AR key, and the second gripper insert positioned near a back surface of the AR key. The two recesses are separated by a portion of the bottom surface, allowing for dual engagement of the key with the friction surface on the second threaded portion. This dual configuration enhances the anti-rotation function by distributing the frictional forces over a larger area. In some cases, the first and second recesses extend over at least fifty percent of the bottom surface.

It should be noted that a single gripper insert may also be used for AR key 405. Additionally, in certain configurations, the teeth can be integrated directly into the body of the AR key 405, forming a single solid piece. For designs incorporating multiple teeth, the front teeth (e.g., teeth 408A in FIG. 4A) can be designed to have a greater or lesser height than the back teeth (e.g., teeth 408B) or have different profile than teeth 408B. This variation in height can either cause or compensate for a rotational moment in the AR key 405, depending on the specific configuration, thereby enhancing its engagement and stability. Furthermore, in cases where the teeth have equal height, the front teeth 408A may still exhibit greater interference with friction surface 422 than the back teeth 408B, depending on the configuration and loading conditions.

In some cases, the shortest distance between the front of the first recess and the front surface of the AR key is at least fifty percent larger than the shortest distance between the back of the second recess and the back surface of the AR key. For example, the shortest distance between the front of the first recess and the front surface of the AR key can be about a few tenths of an inch (e.g., 0.2-0.7 inches), while the shortest distance between the back of the second recess and the back surface of the AR key can be respectively 50% less.

In various embodiments, the body of an AR key can be designed to include at least one additional opening parallel to the primary opening that accommodates the bolt. For instance, FIG. 4A illustrates such openings as openings 431 and 432. These additional openings are specifically configured to receive screws. When a screw is tightened, its motion induces a corresponding movement of the AR key in the opposite direction. This design provides an efficient mechanism for extracting the AR key from a pocket within a threaded portion, such as pocket 440 shown in FIG. 4A. The removal of the AR key 405 enables the connector assembly 12 to be easily disassembled. This process is facilitated even if the teeth 408A and 408B remain within the pocket 440 after the AR key 405 has been extracted.

In operation, tightening the screw causes its end, which enters the additional opening, to advance toward a wall of the first threaded portion, such as the back wall of pocket 440. As the screw advances, it exerts pressure directly against this wall. The resulting force pushes the AR key in the opposite direction, facilitating its removal or repositioning within the pocket.

The incorporation of this mechanism is particularly advantageous in scenarios where the position of the AR needs adjustments within a pocket of the first threaded portion (or an equivalent pocket in a second threaded portion). Moreover, this mechanism allows for retrieving the AR key from such pockets, enhancing the system's reliability and ease of maintenance.

Although the present disclosure and its advantages have been described in detail, it should be understood that various changes, substitutions and alterations can be made herein without departing from the spirit and scope of the disclosure as defined by the following claims.

In the foregoing specification, embodiments of the present disclosure have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the present disclosure, is the literal and equivalent scope of the set of claims that issue from this application, in the specific form in which such claims issue, including any subsequent correction.

What is claimed is:

1. An anti-rotation key for preventing a rotation of a first threaded portion of a connector assembly relative to a second threaded portion of the connector assembly, the anti-rotation key comprising:
- a gripper insert; and
- a body comprising:
  - an inclined surface configured to engage with an engagement slope of one of the first threaded portion or the second threaded portion;
  - a recess positioned along a portion of a bottom surface opposite the inclined surface, the recess configured to receive the gripper insert for engaging with a surface on a remaining one of the first threaded portion or the second threaded portion; and
  - an opening designed to accommodate a fastener, which is configured to secure the anti-rotation key to the first threaded portion or the second threaded portion, the opening having an area larger than that of a cross-sectional area of the fastener to accommodate movement.

2. The anti-rotation key of claim 1, wherein the inclined surface is adjacent to a front surface configured to engage with an activation shoulder of the one of the first threaded portion or the second threaded portion, wherein the inclined surface is configured to form an angle between about ten degrees to about sixty degrees with the bottom surface.

3. The anti-rotation key of claim 1, wherein the recess includes a first set of slots or extensions, and the gripper insert includes a second, opposing set of extensions or slots corresponding to the first set, such that when the recess receives the gripper insert, the first set engages with the second set, thereby securing the gripper insert within the recess.

4. The anti-rotation key of claim 1, wherein the recess is a first recess, the gripper insert is a first gripper insert, wherein the anti-rotation key comprises a second gripper insert, and wherein the body further comprises a second recess positioned along another portion of the bottom surface opposite the inclined surface, the second recess configured to receive the second gripper insert for engaging with the surface.

5. The anti-rotation key of claim 4, wherein the first recess is adjacent to a front surface of the body and the second recess is adjacent to a back surface of the body.

6. The anti-rotation key of claim 1, wherein the body further comprises:
- a front surface configured to engage with an activation shoulder of the first threaded portion or the second threaded portion when the connector assembly is made up;
- a back face configured to face the first threaded portion or the second threaded portion;
- a front face configured to be opposite to the back face; and
- a top surface configured to engage with a top shoulder of the first threaded portion or the second threaded portion.

7. The anti-rotation key of claim 1, comprising at least one additional opening parallel to the opening configured to accommodate the fastener, the at least one additional opening configured to receive a screw, wherein tightening the screw induces a motion of the anti-rotation key opposite to a direction of motion for the screw.

8. The anti-rotation key of claim 7, wherein tightening the screw causes an end of the screw, which enters the opening, to move toward and exert pressure against a wall of the first threaded portion.

9. A system, comprising:
- a connector assembly for connecting a first threaded portion and a second threaded portion; and
- an anti-rotation key disposed in an assembly recess defined within the connector assembly, wherein the anti-rotation key comprises:
  - a gripper insert; and
  - a body comprising:
    - an inclined surface configured to engage with an engagement slope of one of the first threaded portion or the second threaded portion;
    - a recess positioned along a portion of a bottom surface opposite the inclined surface, the recess configured to receive the gripper insert for engaging with a surface on a remaining one of the first threaded portion or the second threaded portion; and
    - an opening designed to accommodate a fastener, which is configured to secure the anti-rotation key to the first threaded portion or the second threaded portion, the opening having an area larger than a cross-sectional area of the fastener to accommodate movement.

10. The system of claim 9, wherein the first threaded portion includes a tapered surface formed therein, and the second threaded portion includes the surface formed therein, wherein the tapered surface and the surface define the assembly recess within the connector assembly.

11. The system of claim 9, wherein the first threaded portion is a male tubular component configured to be threaded into the second threaded portion, which is a female threaded component, wherein a tapered surface is formed within the second threaded portion, and the surface is formed within the first threaded portion, the tapered surface and the surface together defining the assembly recess within the connector assembly.

12. The system of claim 9, wherein the inclined surface is adjacent to a front surface configured to engage with an activation shoulder of the one of the first threaded portion or the second threaded portion, wherein the inclined surface is configured to form an angle of between about ten degrees to about sixty degrees with the bottom surface.

13. The system of claim 9, wherein the recess includes a first set of slots or extensions, and the gripper insert includes a second, opposing set of extensions or slots corresponding to the first set, such that when the recess receives the gripper insert, the first set engages with the second set, thereby securing the gripper insert within the recess.

14. The system of claim 9, wherein the recess is a first recess, the gripper insert is a first gripper insert, wherein the anti-rotation key comprises a second gripper insert, and wherein the body further comprises a second recess positioned along another portion of the bottom surface opposite the inclined surface, the second recess configured to receive the second gripper insert for engaging with the surface.

15. The system of claim 9, wherein the first recess is adjacent to a front surface of the body and the second recess is adjacent to a back surface of the body.

16. The system of claim 9, wherein the body of the anti-rotation key further comprises:

a front surface configured to engage with an activation shoulder of the first threaded portion or the second threaded portion when the connector assembly is made up;

a back face configured to face the first threaded portion or the second threaded portion;

a front face configured to be opposite to the back face; and a top surface configured to engage with a top shoulder of the first threaded portion or the second threaded portion.

17. The system of claim 9, wherein the body of the anti-rotation key further comprises at least one additional opening parallel to the opening configured to accommodate the fastener, the at least one additional opening configured to receive a screw, wherein tightening the screw induces a motion of the anti-rotation key opposite to a direction of motion for the screw.

18. The anti-rotation key of claim 17, wherein tightening the screw causes an end of the screw, which enters the opening, to move toward and exert pressure against a wall of the first threaded portion.

* * * * *